United States Patent [19]

Arnon et al.

[11] Patent Number: 4,467,473
[45] Date of Patent: Aug. 21, 1984

[54] TIME COMPRESSION MULTIPLEX DIGITAL TRANSMISSION SYSTEM

[75] Inventors: Ephraim Arnon; Michael W. Chomik, both of Nepean; Christopher J. Barlow, Ottawa, all of Canada

[73] Assignee: Northern Telecom Limited, Montreal, Canada

[21] Appl. No.: 403,311

[22] Filed: Jul. 30, 1982

[51] Int. Cl.$^3$ .............................................. H04J 3/06
[52] U.S. Cl. .................................... 370/100; 370/109
[58] Field of Search ................ 370/29, 100, 104, 109, 370/48

[56] References Cited

U.S. PATENT DOCUMENTS 4,049,908 9/1977 Knorpp et al. .................... 178/58 R
4,239,934 12/1980 Andren ................................ 370/29

OTHER PUBLICATIONS

Paper, entitled "A Long Burst Time-Shared Digital Transmission System for Subscriber Loops" by J. P. Andry et al., Societe Anonyme de Telecommunications, Paris, France, International Symposium on Subscriber Loops and Services 80, pp. 31–35.

Paper, entitled "Réalisation d'un Équipement Terminal Numérique d'Abonné pour Service Téléphonique et de Données", by R. Montemurro et al., Colloque International de Commutation, International Switching Symposium, Paris, France, May 11, 1979, pp. 926–933.

Primary Examiner—Douglas W. Olms
Assistant Examiner—Kenneth I. Rokoff
Attorney, Agent, or Firm—John E. Mowle

[57] ABSTRACT

A digital transmission system in which bursts of digital signals are transmitted in opposite directions over a two wire telephone loop at fixed frame intervals. Each signal burst is bounded by initial and final synchronization bits at its beginning and ending respectively. Synchronization is established by determining coincidence of the final bit of one burst, the initial bit of the following burst, and two gating signals having an equivalent time interval therebetween.

4 Claims, 3 Drawing Figures

TIME COMPRESSION MULTIPLEX DIGITAL TRANSMISSION SYSTEM

CROSS-REFERENCE TO RELATED APPLICATIONS

The following commonly assigned patent application is related to this application:
Title: Time Compression Multiplex Digital Transmission System
Inventor: Ephraim ARNON
Ser. No.: 402,952
Filed: July 29, 1982

The present invention relates to a digital transmission system and is particularly suited for use in a half-duplex system utilizing time compression multiplexing on telephone loops having discontinuities such as cable gauge changes and bridged taps.

BACKGROUND OF THE INVENTION

Existing subscriber loops can readily provide two-way digital transmission (full-duplex) on a pair of wires using analog signals at voice-band frequencies. This is achieved by amplitude-shift keying, phase-shift keying, frequency-shift keying, or other such techniques. However, full-duplex transmission of high-speed digital signals at ultra-sonic bit rates is difficult to achieve on a single communication path. It has been proposed therefore to employ a time compression multiplex (TCM) technique on a half-duplex transmission system wherein a burst-mode or ping-pong approach is utilized.

Typically in such TCM systems, the digital information signal to be transmitted is divided into discrete portions and each portion compressed with respect to time to form a so-called "burst", occupying less than one half the time of the original portion. The transmitter at each terminal alternately transmits the burst onto the path, following which the associated receiver at each terminal can receive a corresponding burst from the other transmitter. On receipt, each burst is expanded to occupy its original time span. Externally, the system appears to be transmitting the two digital information streams continuously and simultaneously i.e. full-duplex communication. So far as the transmission path is concerned, however, half-duplex transmission takes place with alternate bursts travelling in opposite directions.

Having transmitted its own burst, each transmitter must wait until the incoming burst from the other transmitter has been cleared from the communication path before it can transmit again. Arrival of the incoming burst will be delayed by at least a time interval equal to twice the transmission delay or propagation time of the path. The time interval (dead time) detracts from the efficiency of utilization of the communication path. Thus, for a given burst length, the efficiency decreases as the path length increases. The efficiency can be improved, for a given path length, by increasing the length of each burst, thus increasing the "on" time relative to the "dead" time. However, this exacerbates the synchronizing timing problem by increasing the corresponding reception interval during which the receiver is turned off and hence the receiver's clock receives no control bits to keep it synchronized.

Each receiver must be synchronized to the other's transmitter. U.S. Pat. No. 4,049,908, issued Sept. 20, 1977 and entitled "Method and Apparatus for Digital Data Transmission" describes a system in which a single pulse is transmitted at the beginning of each burst to establish synchronization. A paper entitled "A Long Burst Time-Shared Digital Transmission System for Subscriber Loops" by J. P. Andry et al, Societe Anonyme de Telecommunications, Paris, France, International Symposium on Subscriber Loops and Services 80, pp 31-35; describes an alternate system in which two synchronization framing bits are transmitted at the beginning of each burst.

Such systems function well on short loops, particularly with short bursts, in which strong signals are received. However, on long loops spurious signals resulting from cable irregularities such as gauge changes and bridged taps (which cause reflected pulses), can cause false synchronization to be established. This problem can be alleviated by providing a guard time (as described in U.S. Pat. No. 4,049,908). However, this solution further reduces the data transmission efficiency. Consequently, a problem arises in establishing and maintaining frame synchronization and bit timing between the two terminals utilizing a minimum number of bits.

In a paper by R. Montemurro et al entitled "Réalisation d'un équipement terminal numérique d'abonné pour service téléphonique et de données", colloque international de commutation, International Switching Symposium, Paris, May 11, 1979, pp 926-933; there is described a synchronization technique in which two frame bits are added, one at the beginning and the other at the end of each burst. With this arrangement, false synchronization is more readily prevented than in the other systems since it can only occur if one or the other of the bits which was erroneously detected as a true synchronization bit, is outside the burst. However, such a system still utilizes a guard time to insure that adequate decay of all reflected signals takes place before signal transmission commences in the opposite direction.

Applicant's above-mentioned application Ser. No. 402,952 describes an improvement to such a system wherein once frame synchronization is established, the signals are only gated to the receiver during a window interval which is coextensive with that of the received bursts. With this arrangement a signal burst can be transmitted immediately after one is received at the remote station, with no guard time between the two bursts. However, a problem still arises at the central station due to the relatively large capacitance of the line. It was found that this can cause post transmission transients resulting in a trailing edge on each of the transmitted bursts. On short loops these perturbations or transients would overlap the initial synchronization bits of the received burst at the central station.

This had two negative effects:
(1) the relatively large magnitude of this trailing edge would upset the control unit used to control the automatic line build out (ALBO) unit at the input to the associated receiver; and
(2) this trailing edge would be detected as an initial synchronization bit which in conjunction with some of the received signal bits, would cause the circuit to repeatedly jump into and out of a false synchronization mode, thereby preventing true synchronization from being established.

STATEMENT OF THE INVENTION

It has been found that the first problem can be overcome by blocking the signal to the ALBO control unit not only during the transmit interval but for several bit periods immediately thereafter so that the gain control of the ALBO unit is not influenced by this transient signal.

It has been found that the second problem can be overcome by modifying the circuit in the abovementioned application so that it will check for the presence of an initial synchronization bit a preselected number of bit periods following the final synchronization bit of the previous frame; rather than the presence of a final synchronization bit a preselected number of bit periods following the initial synchronization bit in the same frame. While this arrangement may not prevent false synchronization from being initially established, it will allow the circuit to progressively search through the frame until true frame synchronization has been established.

BRIEF DESCRIPTION OF THE DRAWINGS

An example embodiment of the invention will now be described with reference to the accompanying drawings in which.

DESCRIPTION OF THE PREFERRED EMBODIMENT

Figure 1:
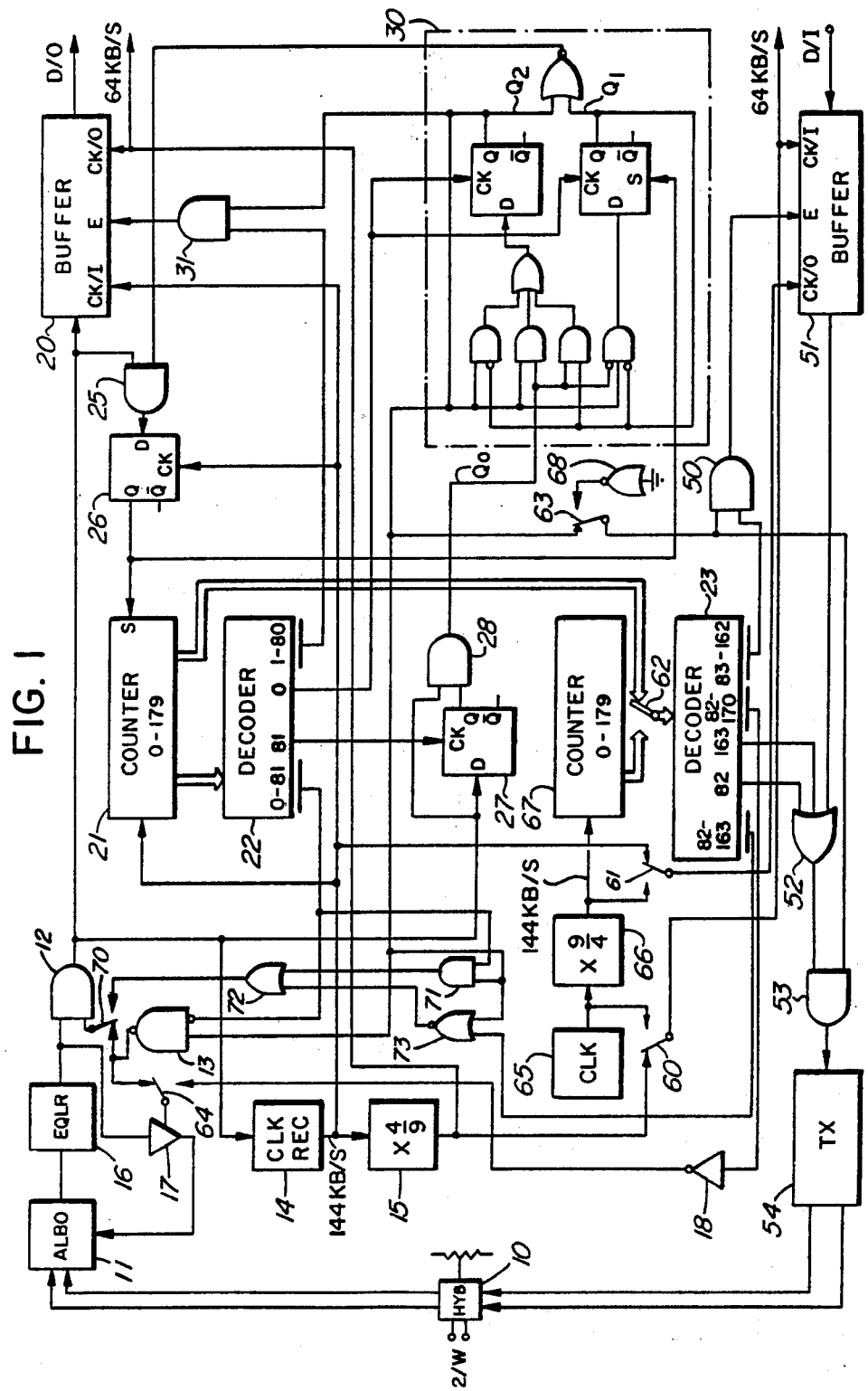
FIG. 1 is a block and schematic diagram of a circuit, which will function as either a central or a remote station in a digital transmission system, in accordance with the present invention.
Figure 2:
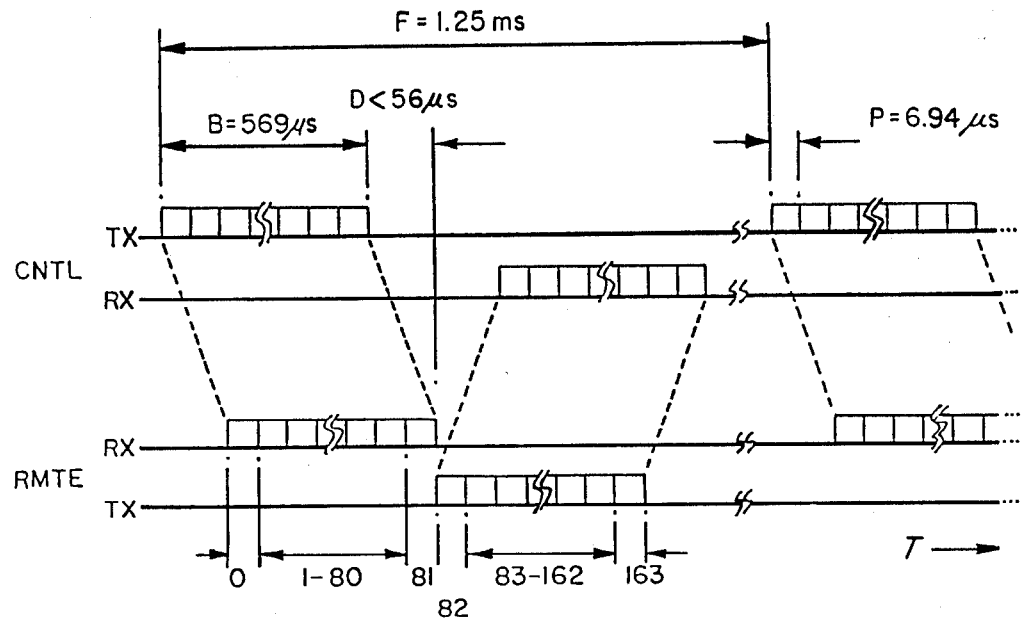
FIG. 2 is a wave form diagram of a digital signal which is transmitted and received by the circuit illustrated in FIG. 1.

Referring to FIGS. 1 and 2, when the circuit is functioning as a central station CNTL, bursts of digital signals are transmitted periodically at the frame rate regardless of whether or not bursts of digital signals are being received from the remote station. However, when the circuit is functioning as a remote station RMTE, signals are transmitted only when frame synchronization of the received signals has been established. The circuit in the example embodiment transmits at a bit rate of 144 Kb/s. As illustrated in FIG. 2, each received or transmitted burst has a total of 80 information bits (1-80 or 83-162 respectively) preceded and followed by initial and final synchronization bits (0 & 81, or 82 & 163 respectively) for a total of 82 bits per burst. All synchronization bits are transmitted as logic 1's while the information bits may be logic 1's or 0's. At a bit rate of 144 Kb/s, the bit period P=6.94 microseconds. This results in a burst period of B=569 microseconds. A frame interval of 1.25 milliseconds provides a sampling rate of 800 bursts per second in each direction. This allows a maximum transmission delay D=56 microseconds, providing a maximum loop length of about 8 killometers.

Referring again to FIG. 1, the circuit functions as either a central station or a remote station depending upon the setting of six switches. With the settings illustrated, the circuit will function as a remote station. In addition, there are four possible modes or operating conditions of the circuit which are dependent upon the reception and recognition of the frame synchronization bits in the received digital signal bursts. These operating conditions which are set forth in Table II, control the reception and transmission of the digital signals at the remote station, and the reception only at the central station. This will be manifest together with the detailed structure of the circuit from the following description of its function and operation.

In the circuit of FIG. 1, bursts of digital signals received over a two wire transmission line 2/W (such as a telephone loop) are coupled through a hybrid transformer 10, an automatic line build out (ALBO) unit 11 and an equalizer 16. One output of the equalizer 16 is connected through an analog gate 17 and back to the control input of the ALBO 11. This provides a signal which controls the gain of the ALBO 11 in a well-known manner. The output of the equalizer 16 is connected through an AND-gate 12 which is normally gated open by the output of a NAND-gate 13 during the anticipated period of arrival of the received signal burst. The output of the AND-gate 12 is fed to a conventional clock recovery circuit 14 which generates a stable 144 Kb/s clock signal at its output. This clock signal is used to drive a 4/9 multiplier 15 which generates a 64 Kb/s clock signal at its output.

The output of the AND-gate 12 is also fed to a buffer 20 which is used to convert the received signal bursts at the 144 Kb/s rate to a continuous 64 Kb/s digital signal at its output, thereby simulating a full-duplex transmission system at the lower bit rate. The 144 Kb/s clock signal is also used to clock a 0-179 counter 21 having multiple outputs which are fed to both a receive-decoder 22 and a transmit-decoder 23 to provide gating signals during the designated bit periods of each frame interval in a well-known manner.

Prior to the reception of an initial signal burst, the remote station is in a no-sync or searching mode. In this mode, an initially received logic 1 (assumed to be the initial bit of a burst) is gated through an AND-gate 25 to set a D flip-flop 26. A logic 1 at the output of the flip-flop 26 then initializes the output of the counter 21 to 1 to synchronize it to the received digital signal.

A logic circuit 30, which comprises four AND-gates, an OR-gate, two D flip-flops and a NOR-gate, functions in a well-known manner to produce the outputs $Q_1$ and $Q_2$ whenever the two flip-flops are clocked by each 0 bit period gating pulse from the output of the decoder 22. This logic circuit 30 functions in accordance with the truth table shown in Table I. The four possible output combinations of $Q_1$ and $Q_2$ determine the conditions detailed in Table II.

Initially, both outputs $Q_2$, $Q_1$ are logic 0's indicating a no-sync or searching condition. Upon reception of an initial logic 1 bit (whether it be the true initial synchronization bit of a burst or not), the $Q_2$, $Q_1$ outputs of the logic circuit 30 are set to logic 0,1 by the logic 1 output of the flip-flop 26, thus indicating a possible found initial bit condition. Depending upon whether or not a true start bit has been found, the final logic 1 synchronization bit or possibly a logic 1 information signal bit of the burst will be coupled from the output of AND-gate 12 to a D flip-flop 27, so that the latter is set when clocked by the 81st bit period gating pulse. Upon its reception, the initial logic 1 bit of the succeeding frame is coupled from the output of AND-gate 12 through AND-gate 28 so that input $Q_0=1$ when the two D flip-flops in the logic circuit 30 are clocked by the 0 bit period gating pulse.

As shown in Table I, a $Q_0=1$ results in the $Q_2$, $Q_1$ outputs of the logic circuit 30 changing from a previous state of logic 0,1 to a next state of logic 1,0, indicating an in-sync or normal condition. The output $Q_2=1$ is the signal confirming frame synchronization. This output $Q_2$ is used to gate an AND-gate 31 which in conjunction with the decoder 22 provides an enabling signal to the buffer 20 during reception of bit periods 1–80 (corresponding to the received information signal bit periods) of each frame interval. Thus an output signal from the buffer 20 is obtained only when frame synchronization is confirmed. The signal confirming frame synchronization $Q_2$ together with that from the decoder 22, is also used to gate the NAND-gate 13 so that during subsequent bursts, its output will go to a logic 1 to gate the AND-gate 12 during the bit periods 0–81 of each frame interval. The output of the NAND-gate 13 is also used to control the analog gate 17 so that only the received signals are coupled back to the control input of the ALBO 11 once synchronization is established. Thus once frame synchronization is established, both gates 12 and 17 are opened only during the anticipated period of reception of the received signal during each frame interval.

Once synchronization is established, the output of the logic circuit 30 remains in the in-sync or normal condition as long as synchronization bits are detected during the 0 and 81st bit periods of each frame interval. However, should a final synchronization bit be lost, due to for instance a perturbation on the 2/W line, the Q output of the flip-flop 27 when clocked during the 81st bit period will go to a logic 0. This condition, or the absence of an initial synchronization bit during the 0 bit period of the succeeding frame will make input $Q_0=0$. As seen from Table I, this causes the $Q_2$, $Q_1$ outputs of the logic unit 30 to go from logic 1,0 to logic 1,1 when the D flip-flops are clocked during the 0 bit period thereby indicating a lost one bit condition. Should either of the next two synchronization bits also be missing (i.e. $Q_0$ remains logic 0), the $Q_2$, $Q_1$ outputs will go from a lost one bit condition logic 0,1 to a no-sync or searching condition logic 0,0, as shown in Table I, during the 0 bit period of the next frame.

Once the circuit has reverted to a no-sync or searching condition, the next logic 1 bit received and coupled through the AND-gate 25 to the flip-flop 26 will cause the counter 21 to again be reset to 1. A return to the searching condition occurs 1 frame+1 bit period after the last entry into the search mode. Thus, a search begins again (equivalently) one bit period after the last search began. This enables the circuit to progressively scan through the frame until true synchronization has been established.

To summarize, the loss of an isolated synchronization bit does not cause the loss of the signal confirming frame synchronization. However, the loss of alternate synchronization bits, or two or more consecutive synchronization bits will cause the loss of the signal confirming frame synchronization and the circuit to revert to the no-sync or searching mode. It will be evident that due to the widely spaced initial and final synchronization bits, short perturbations of less than 0.5 milliseconds will have no affect on the frame synchronization confirmation signal $Q_2$, thereby providing an inherent robustness to the system.

The presence of the synchronization confirmation signal $Q_2$ also gates an AND-gate 50 which in conjunction with the decoder 23 enables a buffer memory 51 so that the incoming digital information signal at a 64 Kb/s rate is converted to bursts of digital signals at the 144 Kb/s rate during bit periods 83–162 of each frame interval. This transmit information signal is then coupled through an OR-gate 52 where the initial and final synchronization bits occurring in bit periods 82 and 163 are added. The combined transmit burst signal at the output of the OR-gate 52 is gated through an AND-gate 53, under control of the synchronization confirmation signal $Q_2$, to a line transmitter 54. The output of the transmitter 54 is coupled through the hybrid 10 to the 2/W telephone loop. Thus, at the remote station, bursts of digital signals are transmitted only when the synchronization confirmation signal $Q_2$ is present.

At the central station, the operation of the received portion of the circuit is identical to that described with respect to the remote station. However, the transmit portion at the central station operates continuously regardless of whether or not signals are being received from the remote station. For operation as a central station, switches 60, 61, 62, 63, 64 and 70 are switched to their alternate positions. An internal 64 Kb/s clock 65 is then used to clock the input of the buffer 51 and a 9/4 multipler 66 which generates a 144 Kb/s clock signal at its output. This signal is used to clock both the output of the buffer 51 and a 0-179 counter 67. The multiple outputs of the counter 67 are in turn connected through switch 62 to the transmit-decoder 23, the outputs of which are coupled to the AND-gate 50 and the OR-gate 52 as described with reference to the remote station. In this configuration, gates 50 and 53 are held open by a NOR-gate 68 having a grounded input.

Also in this configuration, the analog gate 17 is shut during bit periods 82 through 170 by the output of the inverter 18 driven by the decoder 23. This is done so that the ALBO 11 receives no control information during the transmit interval, bit periods 82–163, and for 7 bit periods 164–170, thereafter. With this arrangement, the trailing edge of the transmit signal has no influence on the gain control of the ALBO 11.

Also at the central station, the signal confirming frame synchronization $Q_2$ and the signal from the decoder 22 occurring during bit periods 0–81 of each frame, gate the AND-gate 12 via AND-gate 71 and OR-gate 72 only during the anticipated window interval of the received signal. Thus bothersome transient signals are removed from the receiver input once frame synchronization is established. However, when the receiver is in a searching mode and $Q_2$ is absent, the gate 12 is blocked only during the transmit interval by a signal occurring during bit periods 82–163. This latter signal is coupled to NOR-gate 73, the inverted output of which is used to block AND-gate 12 through OR-gate 72.

Figure 3:
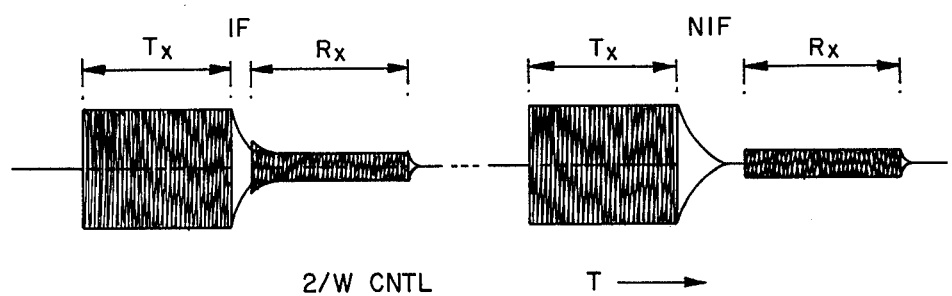
FIG. 3 illustrates bursts of bipolar signals at the 2-wire input to the central station of FIG. 1, showing both interference and non-interference between the transmitted and received signals.

A better understanding of this can be had with reference to FIG. 3 which illustrates several bursts of bipolar signals which are typically used for transmitting digital signals on the 2/W line. The left hand portion of FIG. 3 illustrates a condition in which the exponentially decaying trailing edge of the transmit signal TX (caused by capacitance on the telephone line) is shown interfering at IF with the initial bits of the received signal RX bursts. This condition can only occur at the central station and on short loops since the remote station commences transmission immediately after reception of the received signal burst. At the central station, the trailing edge of the transmit burst will be coupled through the hybrid 10 to the ALBO 11. As this signal appears as a logic 1, it will set the counter 21 to 1. If a logic 1 information signal bit should appear in the received signal burst 81 bits later, false synchronization will be established. However, since the signal bits alternate between logic 1's and 0's, assuming random data is being transmitted, the circuit will remain in false synchronization for only a short period of time whereupon it will revert to the no-sync or searching mode after receiving two consecutive logic 0 signal bits. During the immediately following bit period, either the trailing edge of the transmit signal or the initial bit of the received signal will again cause the circuit to attempt to re-establish synchronization. This may cause false synchronization to again be established. However, the counter 21 controlling the frame will be displaced at least 1 bit period later. This condition will be repeated until true synchronization is established, whereupon the circuit will stop searching.

The right hand portion of FIG. 3 illustrates a condition in which the transmission delay is sufficient to separate the received signal RX from the trailing edge of the transmit signal TX so that no direct interference NIF between the two is encountered. However, even under these conditions, the trailing edge of the transmitted signal will initially cause false synchronization to be established since the initial magnitude of the signal NIF is larger than that of the received signal and will be detected as a logic 1. This occurs because the time of arrival of the signal RX is not known and the receiver, i.e. AND-gate 12, must be gated on during NIF the period immediately following the transmit signal TX.

TABLE I

| INPUT | PREVIOUS STATE | | NEXT STATE | |
|---|---|---|---|---|
| $Q_0$ | $Q_2$ | $Q_1$ | $Q_2$ | $Q_1$ |
| 0 | 0 | 0 | 0 | 0 |
| 0 | 0 | 1 | 0 | 0 |
| 0 | 1 | 0 | 1 | 1 |
| 0 | 1 | 1 | 0 | 0 |
| 1 | 0 | 0 | 0 | 0 |
| 1 | 0 | 1 | 1 | 0 |
| 1 | 1 | 0 | 1 | 0 |
| 1 | 1 | 1 | 1 | 0 |

TABLE II

| STATE | | CONDITION |
|---|---|---|
| $Q_2$ | $Q_1$ | |
| 0 | 0 | NO-SYNC/SEARCHING |
| 0 | 1 | FOUND INITIAL BIT |
| 1 | 0 | IN-SYNC/NORMAL |
| 1 | 1 | LOST ONE (INITIAL/FINAL) BIT |

What is claimed is:

1. In a digital transmission system comprising;
   means for transmitting bursts of digital signals of fixed length and at fixed frame intervals, each burst including initial and final synchronization bits at the beginning and ending respectively, of each burst; and
   means for receiving the bursts of digital signals, including clock recovery means for generating clock pulses synchronized to bits of the digital signals received from the transmitting means;
   the improvement comprising in the receiving means:
   means, responsive to the clock pulses, for generating first and second one bit period gating signals coincident with the anticipated reception of the initial and final synchronization bits respectively in each frame; and
   means for generating a signal confirming frame synchronization, in response to the simultaneous occurrence of the second one bit period gating signal and the final synchronization bit of one frame, and the first one bit period gating signal and the initial synchronization bit of the following frame.

2. A digital transmission system as defined in claim 1 in which the confirming signal generating means includes counter means for generating the first and second one bit period gating signals separated from each other by the fixed burst length, and separated from the next following first and second one bit period gating signals by the fixed frame interval.

3. A digital transmission system having a central station and a remote station each including transmitting and receiving means as defined in claim 1 for alternately transmitting and receiving bursts of digital signals over a single transmission path; and in which:
   the central station transmitting means initiates transmission of each burst at the fixed frame interval;
   the remote station transmitting means initiates transmission of each burst immediately after the remote station receives a burst from the central station transmitting means;
   the central station receiving means includes an automatic line build out unit at the input thereto; gating means for feeding the received signal back to the automatic line build out unit to control the gain thereof; and
   means for disabling the gating means during transmission of each burst and for a preselected number of bit periods thereafter, so as to prevent perturbations resulting from the transmitted burst of digital signals on the single transmission path, controlling said unit.

4. In a digital transmission system comprising:
   means for transmitting bursts of digital signals; and
   means for receiving the bursts of digital signals;
   the improvement comprising:
   in the transmitting means each transmitted burst beginning with an initial synchronization bit and ending with a final synchronization bit separated by a first preselected number of signal bits, the final synchronization bit separated by an interval equal to that of a second preselected number of signal bits from the initial synchronization bit of the following frame;
   and the receiving means also including:
   means for determining the number of synchronization bit intervals between the final synchronization bit of one transmitted burst and the initial synchronization bit of the next succeeding transmitted burst;
   means for determining coincidence between the number of synchronization bit intervals between said final and initial synchronization bits of the one and the next succeeding transmitted bursts;
   means for confirming frame synchronization when said number of synchronization bit intervals is equal to that of said second predetermined number of signal bits.

* * * * *